United States Patent
Kumano et al.

(10) Patent No.: US 7,198,857 B2
(45) Date of Patent: Apr. 3, 2007

(54) POLYESTER FILM FOR FORMING

(75) Inventors: Katsufumi Kumano, Tsuruga (JP); Shinya Higashiura, Otsu (JP); Katsuya Ito, Otsu (JP); Masatoshi Tanabe, Otsu (JP); Shinji Fujita, Tsuruga (JP); Yasushi Sasaki, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/570,162

(22) PCT Filed: Aug. 30, 2004

(86) PCT No.: PCT/JP2004/012874

§ 371 (c)(1),
(2), (4) Date: Mar. 1, 2006

(87) PCT Pub. No.: WO2005/023910

PCT Pub. Date: Mar. 17, 2005

(65) Prior Publication Data
US 2006/0280959 A1 Dec. 14, 2006

(30) Foreign Application Priority Data
Sep. 2, 2003 (JP) .......................... 2003-309804
Sep. 3, 2003 (JP) .......................... 2003-311698

(51) Int. Cl.
B32B 27/36 (2006.01)
C08G 63/12 (2006.01)
C08G 63/127 (2006.01)
C08G 63/16 (2006.01)
C08G 63/181 (2006.01)

(52) U.S. Cl. .............. 428/480; 428/910; 428/213; 428/215; 428/216; 428/334; 428/336; 528/302; 528/308; 528/308.6; 528/308.7

(58) Field of Classification Search .............. None
See application file for complete search history.

(56) References Cited

U.S. PATENT DOCUMENTS

| | | | |
|---|---|---|---|
| 4,585,687 A | | 4/1986 | Posey et al. |
| 5,071,690 A | * | 12/1991 | Fukuda et al. .............. 428/141 |
| 5,093,064 A | * | 3/1992 | Utsumi et al. ............ 264/210.7 |
| 5,424,121 A | | 6/1995 | Murakami et al. |
| 5,674,589 A | | 10/1997 | Bennett et al. |
| 6,197,430 B1 | * | 3/2001 | Asakura et al. .......... 428/847.2 |
| 6,303,210 B1 | * | 10/2001 | Watanabe et al. ........... 428/141 |
| 6,773,802 B2 | * | 8/2004 | Kobayashi et al. ....... 428/847.4 |

FOREIGN PATENT DOCUMENTS

| | | |
|---|---|---|
| EP | 0-314-785 A1 | 5/1989 |
| EP | 0-586-161 A1 | 3/1994 |
| EP | 0-882-758 A1 | 12/1998 |
| JP | 2-204020 | 8/1990 |
| JP | 02-204020 A | 8/1990 |
| JP | 2-305827 | 12/1990 |
| JP | 9-156267 A | 6/1997 |
| JP | 9-187903 A | 7/1997 |
| JP | 10-296937 A | 11/1998 |
| JP | 11-010816 A | 1/1999 |
| JP | 2001-071669 A | 3/2001 |
| JP | 2001-080251 A | 3/2001 |
| JP | 2001-129951 A | 5/2001 |
| JP | 2001-347565 A | 12/2001 |
| JP | 2002-11788 | 1/2002 |
| JP | 2002-097261 | 4/2002 |
| JP | 2002-97261 | 4/2002 |
| JP | 2002-097261 A | 4/2002 |
| JP | 2002-249652 A | 9/2002 |
| JP | 2004-075713 A | 3/2004 |
| JP | 2004-216877 | 8/2004 |
| WO | WO-94/13486 A1 | 6/1994 |

OTHER PUBLICATIONS

International Preliminary Report on Patentability with partial English translation.
Japanese office Action dated Sep. 22, 2005, directed to corresponding JP Application No. 2004-243288.
Supplementary Partial European Search Report mailed on Aug. 17, 2006, for European patent application No. 04772823.3, 5 pages.
International Preliminary Report on Patentability mailed on Jun. 20, 2006 for International Patent Application No. PCT/JP2004/012874 filed on Aug. 30, 2004.

* cited by examiner

Primary Examiner—Vivian Chen
(74) Attorney, Agent, or Firm—Morrison & Foerster LLP

(57) ABSTRACT

A polyester film for forming which is excellent in formability especially at low temperatures and low pressures and in solvent resistance and heat resistance and is reduced in environmental burden. The polyester film for forming is a biaxially oriented polyester film comprising a copolyester as a component, and is characterize in that (1) the stress at 100% elongation of the film in each of the machine direction and the transverse direction is 10 to 1,000 MPa at 25° C. and is 1 to 100 MPa at 100° C.; (2) the storage viscoelasticity (E') of the film in each of the machine direction and the transverse direction is 10 to 1,000 MPa at 100° C. and is 5 to 40 MPa at 180° C.; and (3) the degree of heat distortion (initial load, 49 mN) of the film in the machine direction is −3% to +3% at 175° C.

9 Claims, No Drawings

POLYESTER FILM FOR FORMING

TECHNICAL FIELD

The present invention relates to a polyester film for forming which is excellent in formability especially at low temperatures and low pressures and in solvent resistance and heat resistance and is reduced in environmental burden, and which may be preferably used as nameplates for domestic appliances and cars or as building components.

BACKGROUND ART

A polyvinyl chloride film has represented as sheets for forming and has been preferably used from a view point of workability. However, since this film has problems such as toxic gas generation when it burns, bleeding-out of plasticizer and the like, novel material having reduced environmental burden is demanded in light of recent requirements for environmental protection.

In order to satisfy the aforementioned requirements, non oriented sheets comprised of polyester, polycarbonate and acrylic resins, which are not chloride-containing materials, are used in a wide field. Specially, a non oriented sheets comprised of a polyester resin is considerable because it has high physical properties and transparency, and is economically excellent. For example, JP 9-156267A, JP 2001-71669A, JP 2001-80251A, JP 2001-129951A and JP 2002-249652A disclose non oriented polyester sheets comprised of substantially amorphous polyester resins in which about 30% of ethylene glycol units in polyethylene terephthalate are substituted with 1,4-cyclohexanedimethanol.

Although the above non oriented polyester sheets satisfy formability and lamination properties, they have neither sufficient heat resistance nor solvent resistance due to non orientation. Thus, they have not satisfied the high demand in a commercial market.

JP 9-187903A, JP 10-296937A, JP 11-10816A and JP 11-268215A disclose processes for solving the above problems by using biaxially oriented polyethylene terephthalate films.

However, according to the above processes, heat resistance and solvent resistance are improved, but formability becomes insufficient. Thus, they have not satisfied the demand in a commercial market in total balance of quality.

JP 2001-347565A discloses a process for solving the above problem by specifying the stress at 100% elongation of films.

According to this process, formability is improved with respect to other processes, but its level has not been sufficient to satisfy the high demand on formability in a commercial market. Especially, there remain problems in formability which conforms lowering of forming temperature and in finish of products.

The present inventors have made efforts to solve the aforementioned problems and have already proposed a process for solving the above problems by using copolyester resin with a specified formulation as a raw material and specifying the stress at 100% elongation of the films in Japan Patent Application No. 2002-233694 and Japan Patent Application No. 2003-309894.

According to the above processes, in molding, since the forming pressure is high, formability which conforms lowering of forming temperature and finish of products can be greatly improved, satisfying the demand of a commercial market. However, in forming processes for which a commercial need recently becomes stronger, such as pressure forming and vacuum forming, further improvement in finish of products.

DISCLOSURE OF THE INVENTION

[Problem to Be Solved by the Invention]

The object of the present invention is to provide a polyester film for forming which is excellent in formability especially at low temperatures and low pressures and in solvent resistance and heat resistance and is reduced in environmental burden in order to solve the aforementioned problems.

[Means for Solving the Problem]

The polyester films for forming according to the present invention which can solve the aforementioned problems are as follows:

The first aspect of the present invention is a polyester film for forming which comprises a biaxially oriented polyester film comprising a copolyester as a component, and is characterize in that (1) the stress at 100% elongation of the film in each of the machine direction and the transverse direction is 10 to 1000 MPa at 25° C. and is 1 to 100 MPa at 100° C.;

(2) the storage viscoelasticity (E') of the film in each of the machine direction and the transverse direction is 10 to 1000 MPa at 100° C. and is 5 to 40 MPa at 180° C.; and (3) the degree of heat distortion (initial load, 49 mN) of the film in the machine direction is −3% to +3% at 175° C.

The second aspect of the present invention is the polyester film for forming according to the first aspect of the present invention, which is characterized in that the copolyester comprises an aromatic dicarboxylic acid component and a glycol component containing ethylene glycol and branched aliphatic glycol and/or alicyclic glycol.

The third aspect of the present invention is the polyester film for forming according to the second aspect of the present invention, which is characterized in that the polyester comprised in the biaxially oriented film further comprises 1,3-propanediole units or 1,4-butanediol units as glycol components.

The aspect of the present invention is the polyester film for forming according to the first aspect of the present invention, which is characterized in that the degree of planar orientation of the polyester film for forming is 0.095 or smaller.

The fifth aspect of the present invention is the polyester film for forming according to the first aspect of the present invention, which is characterized in that heat shrinkage at 150° C. of the polyester film is 6.0% or smaller in the machine direction and the transverse direction of the film.

The sixth aspect of the present invention is the polyester film for forming according to the first aspect of the present invention, which is characterized in that a melting point of the polyester film is 200 to 245° C.

The seventh aspect of the present invention is the polyester film for forming according to the first aspect of the present invention, which is characterized in that a ratio H/d of haze H (%) to thickness d (μm) of the film is smaller than 0.010.

The eighth aspect of the present invention is the polyester film for forming according to the first aspect of the present invention, which is characterized in that the polyester film is used as a base film and a surface layer having a thickness of 0.01 to 5 μm is laminated on the base film, wherein the base film is substantially free of particles and only the surface layer contains particles.

The ninth aspect of the present invention is the polyester film for forming according to the eighth aspect of the present invention, which is characterized in that the surface layer comprises mainly an adhesion modifying resin and particles.

[Effect of the Invention]

The polyester film for forming according to the present invention may be applied to a wide variety of forming processes because it is excellent in formability in heat forming, especially in formability at low temperatures and low pressures. In addition, the polyester film for forming may be preferably used as nameplates for domestic appliances and cars or as building components because it is excellent in compliance and form stability (heat shrinkage, thickness spots) when used as products under room temperature atmosphere and is excellent in solvent resistance and heat resistance, and it is reduced in environmental burden.

BEST MODE FOR CARRYING OUT THE INVENTION

In the polyester film for forming according to the present invention, it is important that the stress at 100% elongation at 25° C. ($F100_{25}$) of the film in each of the machine direction and the transverse direction is 10 to 1000 MPa and the stress at 100% elongation at 100° C. ($F100_{100}$) of the film in each of the machine direction and the transverse direction is 1 to 100 MPa. It is not preferable that $F100_{25}$ or $F100_{100}$ exceeds the upper limit of the above range because formability deteriorates. It is not preferable that $F100_{25}$ or $F100_{100}$ falls below the lower limit of the above range because compliance and form stability deteriorates upon a use of the products.

$F100_{25}$ of the film in each of the machine direction and the transverse direction is preferably 10 to 500 MPa, more preferably 10 to 200 MPa, most preferably 10 to 150 MPa.

The upper limit for $F100_{100}$ is preferably 90 MPa, more preferably 80 MPa, most preferably 70 MPa from the view point of formability. On the other hand, the lower limit for $F100_{100}$ is preferably 2 MPa, more preferably 3 MPa, most preferably 5 MPa from the view point of compliance and form stability upon a use of the products.

In the polyester film for forming according to the present invention, it is important that the storage viscoelasticity (E') of the film in each of the machine direction and the transverse direction is 10 to 1000 MPa at 100° C. and is 5 to 40 MPa at 180° C. By adjusting the storage viscoelasticity (E') within the above range, formability may be secured especially at low temperatures and low pressures and, therefore, products with good finish and good size stability may be obtained even in a forming process, such as pressure forming and vacuum forming, which uses a pressure of 10 atmospheric pressure or smaller and thus use only non oriented sheets.

The storage viscoelasticities (E') at 100° C. and 180° C. are parameters affecting formability at low temperatures and low pressures, and size stability. Especially, the present inventors have found that the storage viscoelasticity (E') at 100° C. relates to formability at low temperatures and low pressures, and the storage viscoelasticity (E') at 180° C. relates to size stability. The mechanism that storage viscoelasticites (E') at specific temperatures are important indices on generation of the film properties has not been clearly understood. However, the inventors presume that molecular structures of copolymer components in the polyester constituting the film may concern the mechanism.

The storage viscoelasticity (E') at 100° C. of the film in each of the machine direction and the transverse direction is preferably 20 to 900 MPa, more preferably 30 to 800 MPa, most preferably 40 to 700 MPa. The storage viscoelasticity (E') at 180° C. of the film in each of the machine direction and the transverse direction is preferably 7 to 38 MPa, more preferably 9 to 35 MPa, most preferably 10 to 30 MPa.

In the polyester film for forming according to the present invention, it is important that the degree of heat distortion (initial load, 49 mN) of the film in the machine direction is −3% to +3% at 175° C. The degree of heat distortion (initial load, 49 mN) of the film in the machine direction is preferably −3% to +3% at 180° C., most preferably −3% to +3% at 185° C.

In this context, the degree of heat distortion of the film is the degree of heat distortion at 175° C. by measuring size change of the film according to a heat change with a thermal mechanical analyzer (TMA) under a condition of an initial load of 49 mN and a heating rate of 5° C./minute. By adjusting the degree of heat distortion (initial load, 49 mN) of the film in the machine direction within the above range, solvent resistance of the product may be improved. In addition, products with good finish may be obtained even in a forming process, such as pressure forming and vacuum forming, which uses a pressure of 10 atmospheric pressure or smaller. Additionally, in non oriented film obtained from polyester, polycarbonate or acrylic resins, the degree of heat distortion at 175° C. in the machine direction fall outside the above range of the present invention.

The reason why the degree of heat distortion of the film under a small tension (initial load, 49 mN) correlates to solvent resistance and heat resistance, which seem independent of each other, has not been understood, the present inventors presume that solvent resistance and heat resistance are improved due to generation of molecular orientation by stretching because the polyester film for forming according to the present invention is biaxially oriented.

It is important that (1) the stress at 100% elongation of the film in each of the machine direction and the transverse direction, (2) the storage viscoelasticity (E') of the film in each of the machine direction and the transverse direction, and (3) the degree of heat distortion under a small tension in the machine direction simultaneously satisfy the above respective ranges. When a film is provided with these properties at the same time, the polyester film for forming according to the present invention may be obtained, which exerts effects satisfying the above-mentioned variety of market demands.

The polyester film for forming according to the present invention is a biaxially oriented polyester film comprising copolyester as a component, in which its structure, melting point, molecular weight and formulations and the like are not limited and are arbitrary, as far as it satisfies the above properties. Preferable embodiments of the present invention are described below.

In the polyester film for forming according to the present invention, it is preferable that copolyester comprising an aromatic dicarboxylic acid component and a glycol component containing ethylene glycol and branched aliphatic glycol and/or alicyclic glycol is used as a part or whole of raw materials for a biaxially oriented polyester film.

In the copolyester, the aromatic dicarboxylic acid component comprises mainly terephthalic acid, naphthalenedicarboxilic acid or their derivatives forming esters, the amount of the terephthalic acid and/or naphthalenedicarboxilic acid with respect to the whole dicarboxilic acid component is 70 mol % or greater, preferably 85 mol % or greater, most preferably 95 mol % or greater, further preferably 100 mol %.

The branched aliphatic glycol includes, for example, neopentyl glycol, 1,2-propanediol, 1,2-propanediol and the like. The alicyclic glycol includes, for example, 1,4-cyclohexanedimethanol, tricyclodecanedimethylol, and the like.

Among them, neopentyl glycol and 1,4-cyclohexanedimethanol are most preferable. Further, in the present invention, it is a more preferable embodiment to use 1,3-propanediol or 1,4-butanediol as copolymer components in addition to the above glycol components. It is preferable that these glycols are used as copolymer components to invest the polyester film with the above properties, and it is preferable in that such a polyester film is excellent in transparency and heat resistance, and adhesion to the adhesion modifying layer may be improved.

Furthermore, if required, one or two or more of the following dicarboxilic acid component and/or glycol components may be used as copolymerizable components in the copolyester.

Other dicarboxilic acid components which can be used together with terephthalic acid or its derivatives forming esters includes, for example, (1) aromatic dicarboxilic acid or its derivatives forming esters such as isophthalic acid, 2,6-naphthalendicarboxilic acid, diphenyl-4,4'-dicarboxilic acid, diphenoxyethanedicarboxilic acid, diphenylsulphonicdicarboxilic acid, 5-sodiumsulfoisophthalic acid and the like, (2) aliphatic dicarboxilic acid or its derivatives forming esters such as oxalic acid, succinic acid, adipinic acid, sebacic acid, dimer acid, maleic acid, fumaric acid, gultaric acid and the like, (3) alicyclic acid or its derivatives forming esters such as cyclohexanedicarboxilic acid and the like, (4) oxycarboxilic acid and its derivatives forming esters such as oxycapronic acid and the like.

Other glycol components which can be used together with ethylene glycol and branched aliphatic glycol and/or alicyclic glycol include, for example, aliphatic glycol such as pentanediol, hexanediol and the like, aromatic glycol and its ethylene oxide aducts such as Bisphenol A, Bisphenol S and the like, diethylene glycol, triethylene glycol, dimerdiol and the like.

In addition, if required, multi-functional compounds such as trimellitic acid, trimesic acid, trimethylolpropane and the like may be further copolymerized with the copolyester.

Catalysts used in manufacturing the copolyester include, for example, alkaline earth metal compounds, manganese compounds, cobalt compounds, aluminum compounds, antimony compounds, titanium compounds, titanium/silicon complex oxides, germanium compounds and the like may be used. Among them, titanium compounds, antimony compounds, germanium compounds, and aluminum compounds are preferable in a catalyst activity.

It is preferable that phosphorus compounds is added as thermal stabilizer in manufacturing the copolyester. As the phosphorus compounds, for example, phosphoric acid, phosphorous acid and the like are preferable.

In the copolyester, the intrinsic viscosity is preferable 0.50 dl/g or greater, more preferably 0.55 dl/g or greater, most preferably 0.60 dl/g or greater in formability, adhesion, membrane forming stability. When the intrinsic viscosity is smaller than 0.50 dl/g, formability tends to deteriorate. In addition, when a filter for removing contaminates is provided in a melt line, it is preferable that the upper limit of the intrinsic viscosity is set to 1.0 dl/g in discharge stability for extrusion of melt resin.

In the polyester film for forming according to the present invention, the copolyester itself may be used as a raw material for films, and copolymer formulation may be adjusted by blending the copolyester comprising a large amount of copolymer components with homopolyester (e.g., polyethylene terephthalate).

Especially, when a film is made by blending as mentioned above, the film can be invested with transparency and high temperature melting point (heat resistance), while maintaining softness of the film which is equivalent to that obtained by using only copolyester. In addition, comparing with a case where only homopolyester with a high melting point (e.g., polyethylene terephthalate), softness and a melting point (heat resistance) which is practically nonproblematic can be achieved, while maintaining high transparency.

It is more preferable from formability that the copolyester and at least one of homopolyesters other than polyethyleneterephthalate (e.g., polytetramethyleneterephthalate, polybuthyleneterephthalate) are blended to use as raw materials for the polyester film for forming.

It is preferable for heat resistance and formability that the melting point of the polyester film is 200 to 245° C. By controlling a type and formulation of polymer used, and adjusting the conditions for making films within the above melting point range, the film may be balanced between formability and finish and high quality products can be economically produced. In this context, a "melting point" means a temperature at an endothermic peak for melting which is detected in a primary heating step by differential scanning calorimetry (DSC). The melting point was obtained with a differential scanning calorimeter (V4.OB2000, DuPont) at a heating rate of 20° C./minute. The lowest limit for the melting point is more preferably 210° C., most preferably 230° C. When the melting point is below 200° C., a heat resistance tends to deteriorate. Therefore, it is possible that a problem occurs when the film is subjected to high temperatures in forming and using as a product.

The upper limit for the melting point is preferably high for heat resistance, but when a polyethyleneterephthalate unit is a main component, formability tends to deteriorate in a film having a melting point of above 245° C. In addition, transparency also tends to deteriorate. Moreover, in order to achieve high formability and transparency, it is preferable to adjust the upper limit of the melting point to 240° C.

Further, in order to improve handling properties such as a slip property, a winding property and the like, it is preferable to emboss a film surface. In order to emboss the film surface, particles are generally added into the film.

The above particles include internally deposited particles, external particles such as inorganic and/or organic particles and the like, which have an average particle size of 0.01 to 10 µm. When particles having a particle size of above 10 µm, voids are liable to occur in the film, and handling properties such as a slip property, a winding property and the like tend to deteriorate. The lower limit of the average particle size of the particles is more preferably 0.10 µm, most preferably 0.50 µm in handling properties such as a slip property, a winding property and the like. The upper limit of the average particle size of the particles is more preferably 5 µm, most preferably 2 µm.

Additionally, the average particle size of the particles is calculated by taking a plurality of electron microscopic photos of at least 200 particles or more, by tracing the outlines of those particles to OHP films, and converting the size of the traced outlines into diameters of circles with an image analyzer.

The external particles include, for example, inorganic particles such as wet or dry silica, colloidal silica, aluminum silicate, titan oxide, calcium carbonate, calcium phosphate, barium sulfate, alumina, mica, kaolinite, clay, hydroxyapatite and the like, and organic particles constituting with styrene, silicone, acrylic acid and the like. Among them, inorganic particles such as wet, dry, and colloidal silica, alumina and the like, and organic particles constituting with styrene, silicone, acrylic acid, methacrylic acid, polyester, divinylbenzene and the like are preferably used. Two or more of these internally deposited particles, inorganic particles and/or organic particles may be used together in a range where the film properties defined by the present invention do not deteriorate.

In addition, the amount of the particles added into the film is preferably 0.001 to 10 weight %. When the amount is below 0.001 weight %, handling properties deteriorates, for example, a slip property of the film deteriorates or winding becomes difficult. On the other hand, when the amount is above 10 weight %, formation of coarse bumps, deterioration of film making and transparency is liable to cause.

Furthermore, particles added into the film lower transparency of the film because their refractive index generally differs from that of polyester.

For adding beauty to a product, prints are frequently made on a surface of a film before forming. Since such a printed layer is mostly made on a backside of the film, it is demanded in clarity of print that the film is highly transparent.

Therefore, in order to obtain high transparency while maintaining handling properties of the film, it is useful to use a laminated film in which a base film, which is a main layer, is substantially free of particles, and particles are added into a surface layer having a thickness of 0.01 to 5 μm.

Additionally, the phrase "a base film is substantially free of particles" means that, for example, in a case of inorganic particles, an amount of the particles added is smaller than the detection limit for inorganic element qualification with X-ray fluorescence analysis. This is because it is possible that contaminants from external foreign objects incorporate, even when particles are not purposely added into the base film.

Thin surface layers may be formed by coating or co-extrusion. Among them, coating is preferable because adhesion with the printed layer may also be improved by using a composition consisting of adhesion modifying resin containing particles as a coat. The adhesion modifying resin includes, for example, a resin selected from at least one of polyester, polyurethane, acrylic polymers and/or copolymers of them.

Further, in order to improve adhesion between a main layer polyester film and an adhesion modifying layer, the surface of the main polyester film may be treated in advance, and the adhesion modifying layer may be then formed on the treated surface. Methods of treating the surface include, for example, (1) methods for irradiating activated energy rays, such as corona discharge treatment, plasma discharge treatment, ultraviolet light (UV) irradiation, electron beam (EB) irradiation and the like; (2) flame treatment; (3) vapor depositing such as PVD, CVD and the like.

The layered structure as described above, allows a ratio H/d of haze H (%) to thickness d (μm) of the film is smaller than 0.010, while maintaining the handling properties of the film.

When the polyester film for forming is used in application wherein transparency is specially required, it is preferable in transparency and clarity of print that the ratio H/d of haze H (%) to thickness d (μm) of the film is below 0.010. The ratio H/d is more preferably above 0 and below 0.010, most preferably above 0 and 0.009 or smaller. Additionally, in the present invention, the values of the ratio H/d are described to three decimal places, and the figures after four decimal places are omitted rather than rounded off. For example, the value 0.0099 is indicated as 0.009.

It is preferably in transparency and clarity of print that the lower limit of the ratio H/d is close to zero as possible. However, unless necessary and minimum bumps and dimples are formed on a surface of a film, handling properties such as a slip property and a winding property deteriorate, and then scratches are formed on the film surface or productivity decreases. Therefore, the lowest limit of the ratio H/d is preferably 0.001, most preferably 0.005. In a case of transparent nameplates using a backlight, since higher transparency is demanded, it is preferable that the ratio H/d is further close to zero.

Particles similar to that described above may be used as the particles added into the surface layer. Among such particles, silica particles, glass filler, silica-alumina complex oxide particles are most preferably in transparency because their refractive indices are relatively close to that of polyester.

When particles having an average particle size of above 10 μm are added into the surface layer, frequency of formation of coarse bumps tends to increase to spoil the beauty. On the other hand, when particles having an average particle size of below 0.01 μm are added into the surface layer, handling properties such as a slip property and a winding property tend to deteriorate. The preferable range for an amount of particles added into the surface layer is the same as that in a case where particles are added into the base film of the main layer.

In addition, it is preferable that the amount of the particles added into the surface layer is 0.01 to 25 weight %. When the amount is below 0.01 weight %, handling properties tends to deteriorate, for example, a slip property of the film deteriorates or winding becomes difficult. On the other hand, when the amount is above 25 weight %, transparency and applicability tend to deteriorate.

In order to invest with other properties, the polyester film according to the present invention may be constituted as a laminated layer structure with a known method using different types of polyester. The form of the laminated film includes, but limited to, a two-layer structure with two types of films (A/B), a three-layer structure with two types of films (B/A/B), and a three-layer structure with three types of films (C/A/B).

It is important that the polyester film for forming according to the present invention is a biaxially oriented film. In the present invention, the degree of heat distortion under a small tension of the film (initial load, 49 mN) may be adjusted into the range of the present invention by molecular orientation due to biaxially stretching, improving solvent resistance and size stability, which are drawbacks for non stretched sheet. That is, the one of futures of the present invention is to improve solvent resistance and size stability, which are drawbacks for non stretched sheets, while maintaining good formability of the non stretched sheets.

A process for producing the biaxially oriented polyester films include, but not limited to, for example, after polyester resin is dried, if required, the dried resin is supplied to a known melt extruder, the melt is extruded from a slit die in a sheet form, the extruded melt is tightly attached to a casting drum in a manner of static applying to solidify by cooling, and resulted non stretched sheet is then biaxially stretched.

As a biaxial stretching process, adopted are processes for obtaining a biaxially stretched film having a desired orientation within a surface by stretching a non stretched sheet in a machine direction (MD) and a transverse direction (TD) of the film, and by heating. Among these processes, successive biaxially stretching such as a MD/TD process in which a film is stretched in its machine direction then in its transverse direction or a TD/MD process in which a film is stretched in its transverse direction and then in its machine direction, and simultaneous biaxially stretching in which a film is stretched both in its machine and transverse directions almost simultaneously are desired in film quality. In a case of simultaneous biaxially stretching, a tenter driven with a linear motor may be used. Further, if required, multiple step stretching in which stretching in the same direction is carried out in multiple steps may be used.

A film stretching rate in biaxially stretching is preferably 1.6 to 4.2, most preferably 1.7 to 4.0 in each of machine and transverse directions. In the above situation, either one of stretching rates in a machine direction or a transverse direction may be larger than the other, or these rates may be equivalent to each other. It is more preferable that the stretching rate in a machine direction is 2.8 to 4.0, and the stretching rate in a transverse direction is 3.0 to 4.5.

Stretching conditions for producing the polyester film for forming according to the present invention are not specially limited. However, in order to satisfy the properties defined in the present invention, it is preferable to adopt the following conditions.

In a longitudinal stretching, it is more preferable that a stretching temperature is 50 to 110° C., and a film stretching rate is 1.6 to 4.0 so that a subsequent lateral stretching can be carried out smoothly.

Generally, when a stretching temperature is lower than an adequate condition for stretching polyethylene terephthalate, stretching cannot be carried out because stress at yield suddenly increases at an initial stage after onset of lateral stretching. Even if stretching can be carried out, it is unpleasant because its thickness and stretching rate become uneven.

On the other hand, when a stretching temperature is higher than the adequate condition, an initial stress decreases and the stress does not increase even after increasing the stretching rate. Therefore, a film is obtained which has a small stress at 100% elongation at 25° C. Accordingly, by selecting an optimum stretching temperature, a highly oriented film can be obtained while maintaining stretching properties.

However, in a case where the copolyester comprises 1 to 40 mol % of copolymerizable components, when a stretching temperature is raised in order to attenuate a stress at yield, the stress at elongation rapidly decreases. Moreover, since the stress does not increase even in the latter part of stretching, a degree of orientation does not increase, resulting in attenuation of the stress at 100% elongation at 25° C.

The above phenomenon is liable to occur when a film thickness is 60 to 500 µm, and it occurs frequently in films having a thickness of 100 to 300 µm. For this reason, the following temperature conditions for transverse stretching are preferable when films comprising the copolyester of the present invention are used.

First, it is preferable that preheating temperatures are 50 to 150° C. Second, stretching temperatures in the former part of transverse stretching are preferably −20 to +25° C., most preferably −15 to +25° C. to the preheating temperature. Stretching temperatures in the latter part of transverse stretching are preferably 0 to −40° C., most preferably −10 to −40° C. to the stretching temperature in the former part of transverse stretching. By adopting these conditions, stretching becomes easy in the former part of transverse stretching because the stress in yield is small, and orientation becomes easy in the latter part of transverse stretching. Additionally, it is preferred that stretching rate in a transverse direction is 2.5 to 5.0. Accordingly, films satisfying parameters $F100_{25}$ and $F100_{100}$ which are defined in the present invention can be obtained.

After biaxially stretching, the film is treated by heating. This heat treatment may be carried out by using methods known in the art such as in an oven or on a heated roll. In addition, temperature and time for heat treatment may be arbitrary determined depending on required levels for heat shrinkage. The temperatures for heat treatment are preferably 120 to 245° C., most preferably 150 to 240° C. The time for heat treatment is preferably 1 to 60 seconds. This heat treatment may be carried out with relaxing the film in its machine direction and/or transverse direction. Additionally, in the present invention, it is important that the temperature for heat treatment is set so as to make the degree of planar orientation of the film 0.095 or smaller because even in the above-cited range, an optimized temperature range varies with formulations for film raw materials used. The reason will explained below.

In order to reduce heat shrinkage of the film at 150° C. in the machine direction and the transverse direction, it is preferable to rise the temperature for heating, to extend the time for heating, and to carry out relaxing. Specifically, in order to make the heat shrinkage of the film at 150° C. in the machine direction and the transverse direction 6.0% or smaller, it is preferable that heating is carried out at the temperature of 200 to 220° C. while relaxing is carried out at the relaxing rate of 1 to 8%. In addition, re-stretching may be carried out one or more times in each of the machine direction and the transverse direction and, after that, heating may be carried out.

It is difficult to extend the time for heating by lengthening the production line in order to reduce the heat shrinkage at 150° C. in the machine direction and the transverse direction due to restriction from facilities. In addition, when a feed rate is lowered, productivity deteriorates. Thus, it is important to make a zone temperature at a relatively low temperature around 100° C. to the stretching zone. On the other hand, it is important to gradually rise a temperature to a relatively high temperature around 200° C. in heat setting. Accordingly, it is recommended as a preferred embodiment that heating is enhanced by providing a heating zone with a far infrared heater for solving the aforementioned problems.

Further, it is given that a heat insulation zone having a length of 1 or more meters is provided between the stretching zone and the heat setting zone and, thereby, heating efficiency may be enhanced. Specifically, heating efficiency may be enhanced by reinforcing partitions in each of zones to decrease leakage of heat fluxes. In addition, leakage of heat fluxes may be decreased by conditioning balance and intensity of an air flow to adjust a pressure in an oven while maintaining the air flow. It is also preferable to provide an intensively heating zone with an infrared heater in the case where heating is not sufficient by hot air heating. Furthermore, it is effective to increase a heat amount by increasing length and number of the heat setting zone.

In the polyester film for forming according to the present invention, the storage viscoelasticity (E') of the film in each of the machine direction and the transverse direction is 10 to 1000 MPa at 100° C. and is 5 to 40 MPa at 180° C. In order to achieve the above storage viscoelasticity (E'), when a biaxially stretched film comprising the above copolyester as a component, it is important to control degree of planar orientation of the film within a specified range. That is, the degree of the planar orientation of the film is controlled preferably to 0.095 or smaller, most preferably to 0.001 to 0.090. By decreasing the degree of the planar orientation, the storage viscoelasticity (E') of the film may be decreased.

However, the storage viscoelasticity (E') of the film at 180° C. becomes too small merely by decreasing the degree of the planar orientation. When the copolymer comprising branched aliphatic glycol and/or alicyclic glycol as copolymerizable components, which is a preferred embodiment according to the present invention, is used as a raw material for films, molecular motion at high temperatures can be suppressed due to bulkiness of a molecular structure of the glycols. Moreover, upon a synergistic means for decreasing a degree of a planar orientation using specified stretching conditions, the storage viscoelasticity (E') of the film at 180° C. may be controlled within the above range. Additionally, it is assumed that the effect of co-using 1,3-propanediol units, 1,4-butanediol units cited as a preferred embodiment is exerted because an effect of preventing the storage viscoelasticity (E') of the film at 180° C. from decreasing too much is exerted with formation of fine particles within the copolyester molecules due to incorporation of those units.

As explained above, it is one of preferred embodiments to set a degree of a planar orientation of a biaxially oriented polyester film to low levels, but means for investing those properties are not limited and are arbitrary. As means for reducing a degree of a planar orientation, a method for lowering stretching rate and a method for increasing a heat setting temperature are generally known in the art. The former method is not preferable because film thickness spot aggravate. Therefore, the latter method is preferable. Although the latter method has the above problems, those problems can be solved by means cited as a preferred embodiment and the like. In addition, the present invention essentially uses copolyester as a biaxially oriented polyester film. Since copolyester has a melting point lower than that of homopolyester, the film is liable to fuse with clips holding the film in the transverse stretching when a heat setting temperature becomes high. Accordingly, it is important to cool the vicinity of the clips when the clips release the film at a tenter outlet. Specifically, in order to prevent the film and the clips from fusing, it is preferable to adopt: (1) providing clip parts with heat shields so that the clips are difficult to be heated up; (2) providing a tenter with a clip part cooling mechanism; (3) cooling the whole of the film sufficiently by lengthen a cooling zone after heat setting to enhance cooling capacity; (4) enhancing cooling efficiency by increasing the length and number of the cooling zone; (5) enhancing spontaneous cooling of clips by employing clip returning parts which run outside of the furnace; and the like.

In addition, a light transmittance at 350 nm of the polyester film for forming according to the present invention is preferably 1% or smaller, more preferably 0.8% or smaller, most preferably 0.6% or smaller. By investing the polyester film with the above property, light resistance of the film or, especially when prints are made on the film, light resistance of a printed layer improve.

Methods for adjusting the light transmittance at 350 nm to 1% or smaller are not limited and arbitrary, but it is recommended that an ultraviolet (UV) absorbent is compounded into any one of layers constituting the polyester film for forming. The UV absorbent used in this method is not limited and may be properly selected as far as it can invest the polyester film with the above property. Both inorganic and organic UV absorbents may be used. The organic UV absorbents include benzotriazole UV absorbents, benzophenene UV absorbents, cyclic iminoester UV absorbents and the like, and combinations thereof. Benzotriazole UV absorbents, and cyclic iminoester UV absorbents are preferable in heat resistance. When two or more types of UV absorbents are used together, UV absorbing effects may be further improved because UV lights having different wavelengths can be simultaneously absorbed.

Benzotriazole UV absorbents include, but not especially limited to, for example, 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl) phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl) phenyl]-5-chloro-2H-benzotriazole, 2-[2'-hydroxy-5'-(methacryloyloxyethyl)phenyl]-5-methyoxy-2H-benzotriazole, 2-[2'-hydroxy-5'-(methacryloyloxyethyl) phenyl]-5-cyano-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl) phenyl]-5-nitro-2H-benzotriazole and the like.

Cyclic iminoester UV absorbents include, for example, 2,2'-(1,4-phenylene)bis(4H-3,1-benzoxazin-4-on), 2-methyl-3,1-benzoxazin-4-on, 2-butyl-3,1-benzoxazin-4-on, 2-phenyl-3,1-benzoxazin-4-on, 2-(1- or 2-naphthyl)-3,1-benzoxazin-4-on, 2-(4-biphenyl)-3,1-benzoxazin-4-on, 2-p-nitrophenyl-3,1-benzoxazin-4-on, 2-m-nitrophenyl-3,1-benzoxazin-4-on, 2-p-benzoylphenyl-3,1-benzoxazin-4-on, 2-p-methyoxyphenyl-3,1-benzoxazin-4-on, 2-o-methyoxyphenyl-3,1-benzoxazin-4-on, 2-cyclohexyl-3,1-benzoxazin-4-on, 2-p-(or m-)phthalimidophenyl-3,1-benzoxazin-4-on, 2,2'-(1,4-phenylene)bis(4H-3,1-benzoxazin-4-on), 2,2'-bis(3,1-benzoxazin-4-on), 2,2'-ethylenebis(3,1-benzoxazin-4-on), 2,2'-tetramethylenebis(3,1-benzoxazin-4-on), 2,2'-decamethylenebis(3,1-benzoxazin-4-on), 2,2'-p-phenylenebis(3,1-benzoxazin-4-on), 2,2'-m-phenylenebis(3, 1-benzoxazin-4-on), 2,2'-(4,4'-diphenylene)bis(3,1-benzoxazin-4-on), 2,2'-(2,6- or 1,5-naphthalene)bis(3,1-benzoxazin-4-on), 2,2'-(2-methyl-p-phenylene)bis(3,1-benzoxazin-4-on), 2,2'-(2-nitro-p-phenylene)bis(3,1-benzoxazin-4-on), 2,2'-(2-chloro-p-phenylene)bis(3,1-benzoxazin-4-on), 2,2'-(1,4-cyclohexylene)bis(3,1-benzoxazin-4-on), 1,3,5-tri(3,1-benzoxazin-4-on-2-yl) benzene, 1,3,5-tri(3,1-benzoxazin-4-on-2-yl)naphthalene, and 2,4,6-tri(3,1-benzoxazin-4-on-2-yl)naphthalene, 2,8-dimethyl-4H,6H-benzo(1,2-d;5,4-d')bis-(1,3)-oxazin-4,6-dion, 2,7-dimethyl-4H,9H-benzo(1,2-d;5,4-d')bis-(1,3)-oxazin-4,9-dion, 2,8-diphenyl-4H,8H-benzo(1,2-d;5,4-d')bis-(1,3)-oxazin-4,6-dion, 2,7-diphenyl-4H,9H-benzo(1,2-d;5, 4-d')bis-(1,3)-oxazin-4,6-dion, 6,6'-bis(2-methyl-4H,3,1-benzoxazin-4-on), 6,6'-bis(2-ethyl-4H,3,1-benzoxazin-4-on), 6,6'-bis(2-phenyl-4H,3,1-benzoxazin-4-on), 6,6'-methylenebis(2-methyl-4H,3,1-benzoxazin-4-on), 6,6'-methylenebis(2-phenyl-4H,3,1-benzoxazin-4-on), 6,6'-ethylenebis(2-methyl-4H,3,1-benzoxazin-4-on), 6,6'-ethylenebis(2-phenyl-4H,3,1-benzoxazin-4-on), 6,6'-butylenebis(2-methyl-4H,3,1-benzoxazin-4-on), 6,6'-butylenebis(2-phenyl-4H,3,1-benzoxazin-4-on), 6,6'-oxybis (2-methyl-4H,3,1-benzoxazin-4-on), 6,6'-oxybis(2-phenyl-4H,3,1-benzoxazin-4-on), 6,6'-sulfonylbis(2-methyl-4H,3,1-benzoxazin-4-on), 6,6'-sulfonylbis(2-phenyl-4H,3,1-benzoxazin-4-on), 6,6'-carbonylbis(2-methyl-4H,3,1-benzoxazin-4-on), 6,6'-carbonylbis(2-phenyl-4H,3,1-benzoxazin-4-on), 7,7'-methylenebis(2-methyl-4H,3,1-benzoxazin-4-on), 7,7'-methylenebis(2-phenyl-4H,3,1-benzoxazin-4-on), 7,7'-bis(2-methyl-4H,3,1-benzoxazin-4-on), 7,7'-ethylenebis(2-methyl-4H,3,1-benzoxazin-4-on), 7,7'-oxybis(2-methyl-4H,3,1-benzoxazin-4-on), 7,7'-sulfonylbis(2-methyl-4H,3,1-benzoxazin-4-on), 7,7'-carbonylbis(2-methyl-4H,3,1-benzoxazin-4-on), 6,7'-bis(2-methyl-4H,3,1-benzoxazin-4-on), 6,7'-bis(2-phenyl-4H,3,1-benzoxazin-4-on), 6,7'-methylenebis(2-methyl-4H,3,1-benzoxazin-4-on), and 6,7'-methylenebis(2-phenyl-4H,3,1-benzoxazin-4-on) and the like.

When the above organic UV absorbents are compounded into a film, it is preferable that UV absorbents having a decomposition onset temperature of 290° C. or higher are used in order to lessen in-process contamination because the film is exposed to high temperatures in an extrusion process. It is not preferable to use an UV absorbent having a decomposition onset temperature of 290° C. or lower because decomposed materials from the absorbent adhere to rolls of a production line, re-adhere to the film, or harm the film, which leads to optical drawbacks.

The inorganic UV absorbents include ultra fine particles of metal oxides such as cerium oxide, zinc oxide, titanium oxide and the like.

Another method for adjusting the light transmittance at 350 nm to 1% or smaller is to use compounds constituting polyester, which absorbs light at the wavelength, for example, naphthalenedicarboxylic acid as a copolymerizable component of polyester.

As explained above, upon a use of the polyester film for forming according to the present invention, products with good finish may be obtained even in a forming process, such as pressure forming and vacuum forming, which uses a pressure of 10 atmospheric pressure or smaller and thus forming a conventional biaxially oriented polyester film is difficult. Moreover, since these processes can form products at low costs, they have economical advantages in forming products. Thus, adoption of these forming processes allow the polyester film for forming according to the present invention to exert its effect most effectively.

On the other hand, a molding process has economical disadvantages due to expensiveness of molds and molding machines. However, according to this molding process, products having more complicated shapes than those formed by the aforementioned processes may be formed in high quality. Therefore, when the polyester film for forming according to the present invention is molded, with comparing to the conventional biaxially oriented films, exerted are significant effects that molding can be carried out at lower temperatures and finish of formed products improves.

In addition, since products thus formed are, when used at room temperature and atmosphere, excellent in compliance and form stability (heat shrinkage, thickness spots) and in solvent resistance and heat resistance upon a use of the product, and it is reduced in environmental burden, they may be preferably used as formed parts such as nameplates for domestic appliances and cars, dummy cans, building components, decorative laminated sheets, decorative steel sheets, transfer sheets and the like.

Additionally, the polyester film for forming according to the present invention is preferably used as materials for forming products by processed other than the above mentioned processes, such as pressing, laminating, in-molding, drawing, folding and the like.

EXAMPLES

The present invention will be explained in detail referring to the following Examples. Properties of the films formed in each of Examples are measured and evaluated by the following methods.

(1) Intrinsic Viscosity

Chip sample 0.1 g was precisely weighed, solved in a 25 mL mixed solvent of phenol/tetrachloroethane (60/40, weight ratio) and, viscosities were measured using an Ostwald viscometer. Measurements were carried out three times and the average value was calculated from the three values.

(2) Irregularity in Thickness

A successive tape-like sample of 3 m-long in the transverse direction and 5 cm-long in the machine direction is wound, and the film thickness was measured with a continuous film thickness measurement system (produced by Anritsu Corporation) and thickness data were recorded. The maximum thickness ($T_{max}$), minimum thickness ($T_{min}$) and average thickness ($T_{av}$) were obtained from thickness charts to calculate irregularity in thickness (%) by the following equation. Measurements were carried out three times and the average value was calculated from the three values. In addition, when the samples have a length less than 3 m in the transverse direction, these samples were used after seamed. Thickness data around the seamed regions were eliminated.

$$\text{Irregularity in Thickness (\%)} = ((T_{max} - T_{min})/T_{av}) * 100$$

(3) Haze

Haze of the film was measured with a haze meter (300A, produced by Nippon Denshoku Industries Co., Ltd.) according to JIS-K7136. Measurements were carried out two times and the average value was calculated from the two values.

(4) Thickness of Film

Thicknesses at 15 points (3 sheets, 5 points per sheet) were measured using Militron and the average value was calculated.

(5) Stress at 100% Elongation and Stretching at Breakage

Rectangular samples were cut off by a single-edged razor in a size of 180 mm long and 10 mm wide from a biaxially oriented film in each of the machine direction and the transverse direction. The rectangular samples were pulled on a pull tester (produced by Toyo Seiki Seisaku-sho, Ltd.) and stresses at 100% elongation (MPa) and stretching at breakage (%) in each of the machine direction and the transverse direction were calculated from the obtained load-stress curves.

Measurements were carried out under a 25° C. atmosphere, at 40 mm of initial length, at 100 mm of distance between chucks, at 100 mm/min. of cross head speed, at 200 mm/min. of chart speed of recorder, at 25 kgf of load cell. Measurements were carried out ten times and the average value was calculated.

Pull tests were carried out also under a 100° C. atmosphere under the same conditions as above mentioned. These measurements were carried out after holding the samples for 30 seconds under the 100° C. atmosphere. Measurements were carried out ten times and the average value was calculated.

(6) Heat Shrinkage at 150° C.

Rectangular samples were cut off in a size of 250 mm long and 20 mm wide from a biaxially oriented film in each of the machine direction and the transverse direction. On each of the samples, two marks were made at an interval of 200 mm in the longitudinal direction, and a distance A between these two marks was measured under a constant tension of 5 gf (tension in the longitudinal direction). Then, one side of each of the rectangular samples was hung free of load on a basket with a clip. The samples were put into a Geer oven under 150° C. atmosphere and simultaneously time measurement was started. After 30 minutes, the basket was removed from the Geer oven, and left for 30 minutes at room temperature. After that, for each of the samples, a distance B between the two marks was measured in a 0.25 mm unit with a steel scale under a constant tension of 5 gf (tension in the longitudinal direction). Heat shrinkage at 150° C. of each of the samples was calculated using the measured distances A and B by the following equation.

$$\text{Heat Shrinkage (\%)} = ((A-B)/A)*100$$

(7) Storage Viscoelasticity (E')

Storage viscoelasticities (E') at 100° C. and 180° C. in the machine direction (MD) and the transverse direction (TD) of a film were measured using a dynamic viscoelasticity meter (DVA 225, produced by Aitee Keisoku Seigyo, Ltd.) under the following conditions.
(a) Sample width: 5 mm
(b) Temperature range for measurement: −50 to 250° C.
(c) Frequency: 10 Hz
(d) Heating Rate: 5° C./min.

(8) Degree of Heat Distortion of Film at 175° C.

Degree of heat distortion of a film at 175° C. in the machine direction was measured by continuously monitoring a change in length of the film in the machine direction due to a temperature change using a thermal mechanical analyzer (TMA SS/100, produced by Seiko Instruments, Inc.) under the following conditions.
(a) Sample width: 2 mm
(b) Temperature range for measurement: 30 to 250° C.
(c) Initial Load: 49 mN (5 gf)
(d) Heating Rate: 5° C./min.

(9) Degree of Planar Orientation (ΔP)

Refractive index in the machine direction ($N_x$), refractive index in the transverse direction ($N_y$), and refractive index in the thickness direction ($N_z$) of a film were measured with sodium D line (wavelength 589 nm) as a light source using an Abbe's refractometer, and the degree of planar orientation (ΔP) was calculated by the following equation.

$$\Delta P = ((N_x + N_y)/2) - N_z$$

(10) Light Transmittance at 350 nm

A light transmittance in the ultraviolet region was measured at 350 nm using a spectrophotometer (UV-1200, produced by Shimadzu Corporation).

(11) Light Resistance

An off-set printed sample was placed under a fluorescent light (a U-shape fluorescent light FUL9EX, produced by Matsushita Electric Industries Co., Ltd.) in a dark box so that a printed surface faced down. Then, the sample was continuously irradiated with the light for 2000 hours, and color difference (ΔE) was calculated based on color values (a*, b*, L*) of the printed surface before and after irradiation according to JIS Z 8730. As the color difference (ΔE) is smaller, the change between colors before and after irradiation is smaller, which means that the sample is more excellent in light resistance. The acceptance level for light resistance is that the color difference (ΔE) is 0.5 or smaller. The color difference (ΔE) is calculated by the following equation.

$$(\Delta E) = \sqrt{(\Delta a^* + \Delta b^* + \Delta L^*)}$$

(12) Formability (a) Formability in Vacuum Forming

A grid consisting of 5 mm-square cells was printed on a film, and the film was heated with an infrared heater heated at 500° C. for 10 to 15 seconds. Then, vacuum forming was carried out at a mold temperature of 30 to 100° C. Heating conditions were optimized to each film within the above cited ranges. The mold had a cup-like shape and had an opening with a diameter of 50 mm, a bottom with a diameter of 40 mm and depth of 50 mm, in which all the corners were rounded with a radius of curvature of 0.5 mm.

Formability and finish were rated for five products vacuum formed under optimized conditions according to the following criteria. Additionally, ranks "⊚" and "O" indicate acceptable, and a rank "X" indicates unacceptable.

⊚: (i) no breaks in products;
  (ii) 1 mm or smaller curvature radius of corners, and 0.1 mm or smaller deviation in printing; and
  (iii) no appearance failure applicable to rank X, O: (i) no breaks in products;
  (ii) larger than 1 mm and 1.5 mm or smaller radius of curvature of the corners, or larger than 0.1 mm and 0.2 mm or smaller deviation in printing; and
  (iii) no appearance failure applicable to rank X, and no problem in practical use, X: breaks in products, or
  no breaks in products and applicable to any one of the following items:
  (i) larger than 1.5 mm curvature radius of corners;
  (ii) appearance failure with large wrinkles;
  (iii) reduced transparency due to film blanching; and
  (iv) larger than 0.2 mm deviation in printing.

(b) Formability in Pressure Forming

A grid consisting of 5 mm-square cells was printed on a film, and the film was heated with an infrared heater heated at 500° C. for 10 to 15 seconds. Then, pressure forming was carried out at a mold temperature of 30 to 100° C. under 4 atmospheric pressures. Heating conditions were optimized to each film within the above cited ranges. The mold had a cup-like shape and had an opening with a diameter of 50 mm, a bottom with a diameter of 40 mm and depth of 50 mm, in which all the corners were rounded with a radius of curvature of 0.5 mm.

Formability and finish were rated for five products vacuum formed under optimized conditions according to the following criteria. Additionally, ranks "⊚" and "O" indicate acceptable, and a rank "X" indicates unacceptable.

⊚: (i) no breaks in products;
  (ii) 1 mm or smaller curvature radius of corners, and 0.1 mm or smaller deviation in printing; and
  (iii) no poor appearance applicable to rank X, O: (i) no breaks in products;
  (ii) larger than 1 mm and 1.5 mm or smaller radius of curvature of the corners, or larger than 0.1 mm and 0.2 mm or smaller deviation in printing; and (iii) no poor appearance applicable to rank X, and no problem in practical use, X: breaks in products, or no breaks in products and applicable to any one of the following items:

(i) larger than 1.5 mm curvature radius of corners;

(ii) poor appearance with large wrinkles;

(iii) reduced transparency due to film blanching; and (iv) larger than 0.2 mm deviation in printing.

(c) Formability in Molding

After printing on a film, the film was contact-heated with a heated plate at 100 to 140° C. for 4 seconds. Then, press molding was carried out at a mold temperature of 30 to 70° C. at a holding time of 5 seconds. Heating conditions were optimized to each film within the above cited ranges. The mold had a cup-like shape and had an opening with a diameter of 50 mm, a bottom with a diameter of 40 mm and depth of 50 mm, in which all the corners were rounded with a radius of curvature of 0.5 mm.

Formability and finish were rated for five products vacuum formed under optimized conditions according to the following criteria. Additionally, ranks "⊚" and "O" indicate acceptable, and a rank "X" indicates unacceptable.

⊚: (i) no breaks in products;

(ii) 1 mm or smaller curvature radius of corners, and 0.1 mm or smaller deviation in printing; and (iii) no poor appearance applicable to rank "X", O: (i) no breaks in products;

(ii) larger than 1 mm and 1.5 mm or smaller radius of curvature of the corners, or larger than 0.1 mm and 0.2 mm or smaller deviation in printing; and (iii) no poor appearance applicable to rank X, and no problem in practical use, X: breaks in products, or no breaks in products and applicable to any one of the following items:

(i) larger than 1.5 mm curvature radius of corners;

(ii) poor appearance with large wrinkles;

(iii) reduced transparency due to film blanching; and (iv) larger than 0.2 mm deviation in printing.

(13) Solvent Resistance

Samples were immersed into toluene at 25° C. for 30 minutes. Then, appearance changes between before and after immersion were observed according to the following criteria. Rank "O" indicates acceptable.

O: almost no change in appearance, and smaller than 1% of change in haze,

X: perceptible change in appearance, or 1% or more of change in haze.

(14) Print Quality

Before printing on a film, the film was heat-treated at 90° C. for 30 minutes, and 4-color screen printing was done.

Then, the film on which a print layer was made was dried at 80° C. for 30 minutes. In evaluation of print quality, appearance of printing such as clarity, printability, deviation in printing and the like as listed below was observed by naked eyes through the film from its backside rather than the printed side. When a sample showed no problem in the following criteria, the sample was judged as rank "O". When a sample showed at least one problem in the following criteria, the sample was judged as rank "X".

a. Clarity

Print designs can be observed clearly without obstructed by a base film or laminated layers.

b. Printability

Color shading or missing do not occur due to transferring failure of printing ink.

c. Deviation in Printing

Deviation in printing cannot be observed by naked eyes.

Example 1

Copolyester chip (A) having an intrinsic viscosity of 0.69 dl/g which comprises 100 mol % of terephthalic acid units as an aromatic dicarboxylic acid component, 40 mol % of ethylene glycol units and 60 mol % of neopentyl glycol units as a diol component and polyethylene terephthalate chip (B) having an intrinsic viscosity of 0.69 dl/g which comprises 0.04 weight % of amorphous silica having an average particle size of 1.5 μm (observed by SEM) were dried separately. Then, the chips (A) and (B) were mixed at a weight ratio of 25:75. Next, the chip mixture was melted and extruded at 270° C. from a slit of T-shape die using an extruder to rapidly solidify it on chill rolls at a surface temperature of 40° C. Simultaneously, it was tightly attached to the chill rolls using an electrostatic application process to obtain a non stretched amorphous sheet.

The obtained non stretched sheet was stretched 3.3 times at 90° C. in the machine direction between heating rolls and cooling rolls. Then, the monoaxially stretched film was guided to a tenter, preheated at 120° C. for 10 seconds, and it was stretched 3.9 times at 110° C. in a former part of a transverse stretching and at 100° C. in a latter part of a transverse stretching. Further, it was treated by heat setting at 235° C. with relaxing at 7% in the transverse direction to obtain a biaxially stretched polyester film having a thickness of 100 μm.

Additionally, a 2 m-long intermediate zone was provided between a stretching zone and a heat setting zone, a heating zone in the stretching zone was provided with a far infrared heater, and each zone was provided with partitions extending to a limit level where the partition did not contact to a film. Zone partitioning was enhanced also in a cooling zone after heating. Film fusing with clips was prevented by employing clip returning parts which run outside of the furnace and by employing a clip cooling system to compulsorily cool them with 20° C. air blow to make a temperature of clips at a tenter outlet 40° C. or lower.

Comparative Example 1

According to the same manner as that of Example 1 except that the heat setting temperature was changed to 205° C. in Example 1, a biaxially stretched film was obtained.

Comparative Example 2

Properties for a commercial A-PET non stretched sheet (PETMAX® A560GE0R, produced by Toyobo Ltd, thickness: 200 μm) were evaluated.

Comparative Example 3

Properties for a commercial polycarbonate non stretched sheet (PANLITE® PC2151, produced by Teijin Chemicals Ltd., Thickness: 200 μm) were evaluated.

Comparative Example 4

Acrylic non stretched sheet (ACRYPLEN® HBS006, produced by Mitsubishi Chemical Corporation, Thickness: 125 μm) were evaluated.

Example 2

Copolyester chip (C) having an intrinsic viscosity of 0.77 dl/g which comprises 100 mol % of terephthalic acid units as an aromatic dicarboxylic acid component, 70 mol % of ethylene glycol units and 30 mol % of neopentyl glycol units as a diol component, polyethylene terephthalate chip (D) having an intrinsic viscosity of 0.63 dl/g which comprises 0.04 weight % of amorphous silica having an average particle size of 1.5 μm (observed by SEM) and polypropylene terephthalate chip (E) having an intrinsic viscosity of 0.75 dl/g which comprises 0.04 weight % of amorphous silica having an average particle size of 1.5 μm (observed by SEM) were dried separately. Then, the chips (C), (D) and (E) were mixed at a weight ratio of 50:10:40. Next, the chip mixture was melted and extruded at 270° C. from a slit of T-shape die using an extruder to rapidly solidify it on chill rolls at a surface temperature of 40° C. Simultaneously, it was tightly attached to the chill rolls using an electrostatic application process to obtain a non stretched amorphous sheet.

The obtained non stretched sheet was stretched 3.5 times at 83° C. in the machine direction between heating rolls and cooling rolls. Then, the monoaxially stretched film was guided to a tenter, preheated at 95° C. for 10 seconds, and it was stretched 3.9 times at 80° C. in a former part of a transverse stretching and at 75° C. in a latter part of a transverse stretching. Further, it was treated by heat setting at 200° C. with relaxing at 7% in the transverse direction to obtain a biaxially stretched polyester film having a thickness of 100 μm.

Additionally, a 2 m-long intermediate zone was provided between a stretching zone and a heat setting zone, a heating zone in the stretching zone was provided with a far infrared heater, and each zone was provided with partitions extending to a limit level where the partition did not contact to a film. Zone partitioning was enhanced also in a cooling zone after heating. Film fusing with clips was prevented by employing clip returning parts which run outside of the furnace and by employing a clip cooling system to compulsorily cool them with 20° C. air blow to make a temperature of clips at a tenter outlet 40° C. or lower.

Example 3

Copolyester chip (F) having an intrinsic viscosity of 0.71 dl/g which comprises 100 mol % of terephthalic acid units as an aromatic dicarboxylic acid component, 70 mol % of ethylene glycol units and 30 mol % of 1,4-cyclohexanedimethanol units as a diol component and polyethylene terephthalate chip (B) were mixed at a weight ratio of 50:50 and dried. Next, the chip mixture was melted and extruded at 270° C. from a slit of T-shape die using an extruder to rapidly solidify it on chill rolls at a surface temperature of 40° C. Simultaneously, it was tightly attached to the chill rolls using an electrostatic application process to obtain a non stretched amorphous sheet.

The obtained non stretched sheet was stretched 3.5 times at 90° C. in the machine direction between heating rolls and cooling rolls. Then, the monoaxially stretched film was guided to a tenter, preheated at 120° C. for 10 seconds, and it was stretched 3.9 times at 105° C. in a former part of a transverse stretching and at 100° C. in a latter part of a transverse stretching. Further, it was treated by heat setting at 220° C. with relaxing at 7% in the transverse direction to obtain a biaxially stretched polyester film having a thickness of 100 μm.

Additionally, a 2 m-long intermediate zone was provided between a stretching zone and a heat setting zone, a heating zone in the stretching zone was provided with a far infrared heater, and each zone was provided with partitions extending to a limit level where the partition did not contact to a film. Zone partitioning was enhanced also in a cooling zone after heating. Film fusing with clips was prevented by employing clip returning parts which run outside of the furnace and by employing a clip cooling system to compulsorily cool them with 20° C. air blow to make a temperature of clips at a tenter outlet 40° C. or lower.

Comparative Example 5

According to the same manner as that of Example 3 except that the heat setting temperature was changed to 205° C. in Example 3, a biaxially stretched film having a thickness of 188 μm was obtained.

Example 4

Copolyester chip (A) having an intrinsic viscosity of 0.69 dl/g which comprises 100 mol % of terephthalic acid units as an aromatic dicarboxylic acid component, 40 mol % of ethylene glycol units and 60 mol % of neopentyl glycol units as a diol component and polybutylene terephthalate chip (G) having an intrinsic viscosity of 0.69 dl/g which comprises 0.04 weight % of amorphous silica having an average particle size of 1.5 μm (observed by SEM) were dried separately. Then, the chip (A), chip (G) and a benzotriazole ultraviolet absorbent (I) (TINUVIN 326, produced by Ciba Specialty Chemicals) were mixed at a weight ratio of 25.0:74.5:0.5. Next, the chip mixture was melted and extruded at 265° C. from a slit of T-shape die using an extruder to rapidly solidify it on chill rolls at a surface temperature of 20° C. Simultaneously, it was tightly attached to the chill rolls using an electrostatic application process to obtain a non stretched amorphous sheet.

The obtained non stretched sheet was stretched 3.3 times at 80° C. in the machine direction between heating rolls and cooling rolls. Then, the monoaxially stretched film was guided to a tenter, preheated at 95° C. for 10 seconds, and it was stretched 3.8 times at 85° C. in a former part of a transverse stretching and at 80° C. in a latter part of a transverse stretching. Further, it was treated by heat setting at 200° C. with relaxing at 7% in the transverse direction to obtain a biaxially stretched polyester film having a thickness of 100 μm.

Additionally, a 2 m-long intermediate zone was provided between a stretching zone and a heat setting zone, a heating zone in the stretching zone was provided with a far infrared heater, and each zone was provided with partitions extending to a limit level where the partition did not contact to a film. Zone partitioning was enhanced also in a cooling zone after heating. Film fusing with clips was prevented by employing clip returning parts which run outside of the furnace and by employing a clip cooling system to compulsorily cool them with 20° C. air blow to make a temperature of clips at a tenter outlet 40° C. or lower.

Comparative Example 6

According to the same manner as that of Example 4 except that the heat setting temperature was changed to 185° C. in Example 4, a biaxially stretched film having a thickness of 100 μm was obtained.

Example 5

(Preparation of Dope)

A dope was prepared which contained a copolyester resin (VYLONAL MD-1250, produced by Toyobo Ltd.) at a solid content of 3.15 weight %, a water soluble urethane resin having a terminal isocyanate group blocked with a hydrophilic group (ELASTRON H-3, produced by Dai-Ichi Kogyo Seiyaku Co., Ltd) at a solid content of 5.85 weight %, silica particles having an average particle size of 1.0 μm at 0.8 weight % with respect to the whole content of the resins, and silica particles having an average particle size of 0.05 μm at 10 weight % with respect to the whole content of the resins in a 40 weight % of isopropanol aqueous solution. The obtained dope was adjusted to pH 6.5 with a 5 weight % of sodium bicarbonate aqueous solution. Then, it was filtered with a bag type filter (Liquid Filter Bag, produced by Sumitomo 3M Ltd.) and agitated at 15° C. for 2 hours in a dope circulating stock tank.

(Production of Laminated Film)

According to the same manner as that of Example 1 except that polyethylene terephthalate chip (H) was used in place of the polyethylene terephthalate chip (B) in Example 1, a non stretched amorphous film. In addition, the dope amount of the melted resin was adjusted to make the final film thickness 188 μm.

The obtained non stretched sheet was stretched 3.3 times at 90° C. in the machine direction between heating rolls and cooling rolls. Then, the dope was applied on the one side of the monoaxially stretched film by a reverse kiss-coat process so that the thickness of the resin solid before stretching was 0.9 μm. Next, the monoaxially stretched film having a dope applied layer was guided to a tenter while drying, preheated at 120° C. for 10 seconds, and it was stretched 3.9 times at 110° C. in a former part of a transverse stretching and at 100° C. in a latter part of a transverse stretching. Further, it was treated by heat setting at 235° C. with relaxing at 7% in the transverse direction to obtain a biaxially stretched polyester film having a thickness of 100 μm.

Additionally, a 2 m-long intermediate zone was provided between a stretching zone and a heat setting zone, a heating zone in the stretching zone was provided with a far infrared heater, and each zone was provided with partitions extending to a limit level where the partition did not contact to a film. Zone partitioning was enhanced also in a cooling zone after heating. Film fusing with clips was prevented by employing clip returning parts which run outside of the furnace and by employing a clip cooling system to compulsorily cool them with 20° C. air blow to make a temperature of clips at a tenter outlet 40° C. or lower.

Comparative Example 7

Polyethylene terephthalate (PET) chip (J) was obtained by weighing dimethyl terephthalate and ethylene glycol, by adding magnesium acetate and antimony trioxide as catalysts, phosphoric acid as an additive, and a wet silica having an average particle size of 1.5 μm (observed by SEM) (0.08 weight %) and by polymerizing them via a conventional method to form polyethylene terephthalate. The obtained PET chip (J) had an intrinsic viscosity of 0.65 dl/g, and a terminal carboxy group concentration of 25 eq/ton, and a M/P molar ratio of 2.5.

After the PET chip (J) was dried under a vacuum at 180° C. for 4 hours, it was supplied into a melt extruder to extrude it from a slit die in a sheet form, and it was tightly attached to a mirror surface cooling drum using an electrostatic application process (3.0 kV) and was solidified to obtain a non stretched sheet. This non stretched sheet was first stretched 3.0 times in the machine direction on rolls heated at 105° C., and it was then stretched 3.2 times in the transverse direction at 125° C. After that, 6% relaxing in the transverse direction and 6 second heating at 195° C. were carried out to obtain a biaxially stretched polyester film having a thickness of 100 μm and a degree of planar orientation of 0.138.

Additionally, Comparative Example 7 was carried out to compare the present invention with prior art according to Example 1 described in JP 2001-347565A.

For Examples 1 to 5, Comparative Examples 1, 5, 6 and 7, raw material formulations and properties of polymers are shown in Table 1, production conditions and properties of films are shown in Tables 2 to 5. For Comparative Examples 2 to 4, properties of films are shown in Table 6.

Upon use of the biaxially oriented films obtained in Examples 1 to 5, products with good finish were obtained even in processes using a low pressure for forming, such as pressure forming and vacuum forming. Moreover, solvent resistance and size stability of the obtained products were also good. In addition, since the film obtained in Example 4 contained an ultraviolet absorbent, its light transmittance in the ultraviolet wavelength region at 350 nm was 0.6%. Therefore, in this film, the color difference on the printed side after continuously irradiating light for 2000 hours was 0.5 or less, which was smaller than those of films obtained in Examples 1 to 3, and the light resistance was excellent. Further, the film obtained in Example 5 was more excellent in transparency than that of the film obtained in Example 1 containing silica particles in its base film.

On the other hand, the films obtained in Comparative Examples 1, 5, 6 and 7 were poor in formability in vacuum forming and pressure forming and, therefore, finish of products was bad. Moreover, the films obtained in these Comparative Examples were poorer in finish in molding with respect to the films obtained in Examples 1 to 4. Further, the non stretched films obtained in Comparative Examples 2 to 4 were good in formability but poor in solvent resistance and size stability.

INDUSTRIAL APPLICABILITY

The polyester film for forming according to the present invention may be applied to a wide variety of forming processes because it is excellent in formability in heat forming, especially in formability at low temperatures and low pressures. In addition, the polyester film for forming is excellent in compliance and form stability (heat shrinkage, thickness spots) when used as products under room temperature atmosphere and is excellent in solvent resistance and heat resistance, and it is reduced in environmental burden. The polyester film for forming is applicable to a three dimensional decoration process in which designs such as print layers and figure layers are made on a printability modified layer of the film by a variety of print decoration processes such as letterpress printing, intaglio printing, litho printing, screen printing, offset printing, gravure printing, inkjet printing, flexographic printing and the like, and decoration processes such as textile printing, decarcomania, coating, painting, deposition, sputtering, CVD, lamination and the like, and the film is formed by a variety of forming processes such as molding, pressure forming, vacuum forming and the like. Further, the polyester film is excellent in in-mold formability and emboss formability. Accordingly, the polyester film for forming according to the present invention greatly contributes to industries because it may be preferably used as nameplates for domestic appliances and cars or as building components.

TABLE 1

| | | Polyester Formulation (mol %) | | | | | | Particle | Polymer Properties |
| | | Acids | Glycols | | | | | SiO$_2$ | Intrinsic |
| | | TPA | EG | NPG | CHDM | PG | BG | Amount (ppm) | Visco. (dl/g) |
|---|---|---|---|---|---|---|---|---|---|
| A | Copoly PEs (1) | 100 | 40 | 60 | — | — | — | — | 0.69 |
| B | PET (1) | 100 | 100 | — | — | — | — | 400 | 0.69 |
| C | Copoly PEs (2) | 100 | 70 | 30 | — | — | — | — | 0.77 |
| D | PET (2) | 100 | 100 | — | — | — | — | 400 | 0.63 |
| E | PTT | 100 | — | — | — | 100 | — | 400 | 0.75 |
| F | Copoly PEs (3) | 100 | 70 | — | 30 | — | — | — | 0.71 |
| G | PBT | 100 | — | — | — | — | 100 | 400 | 0.69 |
| H | PET (3) | 100 | 100 | — | — | — | — | — | 0.69 |
| J | PET (4) | 100 | 100 | — | — | — | — | 800 | 0.65 |

TABLE 2

| | | | | Ex. 1 | Comp. Ex. 1 | Ex. 2 |
|---|---|---|---|---|---|---|
| Component | A | Copoly PEs (1) | | 25 | 25 | — |
| Weight | C | Copoly PEs (2) | | — | — | 50 |
| Ratio | F | Copoly PEs (3) | | — | — | — |
| | B | PET (1) | | 75 | 75 | — |
| | D | PET (2) | | — | — | 10 |
| | H | PET (3) | | — | — | — |
| | E | PTT | | — | — | 40 |
| | G | PBT | | — | — | — |
| Film | MD | Stret. Temp. (° C.) | | 90 | 90 | 83 |
| Making | | Stret. Rate (−) | | 3.3 | 3.3 | 3.5 |
| Conditions | TD | Preheat Temp. (° C.) | | 120 | 120 | 95 |
| | | Preheat Time (sec.) | | 10 | 10 | 10 |
| | | Stret. Temp., former (° C.) | | 110 | 110 | 80 |
| | | Stret. Temp., latter (° C.) | | 100 | 100 | 75 |
| | | Stret. Rate (−) | | 3.9 | 3.9 | 3.9 |
| | | Relaxing Rate (%) | | 7 | 7 | 7 |
| | WHOLE | Heat Temp. (° C.) | | 235 | 205 | 200 |
| Film | | Thickness (μm) | | 100 | 100 | 100 |
| Properties | | Haze (%) | | 3.6 | 3.6 | 3.7 |
| | | Tm (° C.) | | 230 | 230 | 215 |
| | | Degree of Planner Orientation | | 0.078 | 0.11 | 0.035 |
| | | F100 (MPa) | MD/TD (25° C.) | 80/85 | 110/120 | 70/75 |
| | | | MD/TD (100° C.) | 30/30 | 70/75 | 25/25 |
| | | E' (MPa) | MD/TD (100° C.) | 250/250 | 1050/1100 | 90/90 |
| | | | MD/TD (180° C.) | 30/30 | 60/60 | 15/15 |
| | | TE (%) | MD/TD (100° C.) | 350/330 | 230/240 | 330/330 |
| | | Degree of Heat Distortion at 175° C. (%): MD | | 1.0 | 1.5 | 1.5 |
| | | Shrinkage (%) | MD/TD (150° C.) | 1.5/0.6 | 2.3/1.2 | 1.8/0.9 |
| | | Unevenness of Thickness (%) | | 5.5 | 5.1 | 4.9 |
| | | Light Transmit. at 350 nm (%) | | 75 | 75 | 75 |
| | | Formability in Vacuum Forming | | ○ | X | ○ |
| | | Formability in Pressure Forming | | ○ | X | ⊙ |
| | | Formability in Molding | | ⊙ | ○ | ⊙ |
| | | Solvent Resistance | | ○ | ○ | ○ |
| | | Print Quality | | X | X | X |

TABLE 3

| | | | Ex. 3 | Comp. Ex. 5 | Ex. 4 | Comp. Ex. 6 |
|---|---|---|---|---|---|---|
| Component | A | Copoly PEs (1) | — | — | 25.0 | 25.0 |
| Weight | B | PET (1) | 50 | 50 | — | — |
| Ratio | C | Copoly PEs (2) | — | — | — | — |
| | D | PET (2) | — | — | — | — |
| | E | PTT | — | — | — | — |
| | F | Copoly PEs (3) | 50 | 50 | — | — |
| | G | PBT | — | — | 74.5 | 74.5 |
| | I | UV Absorbent | — | — | 0.5 | 0.5 |

TABLE 3-continued

|  |  |  |  | Ex. 3 | Comp. Ex. 5 | Ex. 4 | Comp. Ex. 6 |
|---|---|---|---|---|---|---|---|
| Film Making Conditions | MD | Stret. Temp. (° C.) |  | 90 | 90 | 80 | 80 |
|  |  | Stret. Rate (–) |  | 3.5 | 3.5 | 3.3 | 3.3 |
|  | TD | Preheat Temp. (° C.) |  | 120 | 120 | 95 | 95 |
|  |  | Preheat Time (sec.) |  | 10 | 10 | 10 | 10 |
|  |  | Stret. Temp., former (° C.) |  | 105 | 105 | 85 | 85 |
|  |  | Stret. Temp., latter (° C.) |  | 100 | 100 | 80 | 80 |
|  |  | Stret. Rate (–) |  | 3.9 | 3.9 | 3.8 | 3.8 |
|  |  | Relaxing Rate (%) |  | 7 | 7 | 7 | 7 |
|  | WHOLE | Heat Temp. (° C.) |  | 220 | 205 | 200 | 185 |
| Film Properties | Thickness (μm) |  |  | 100 | 100 | 100 | 100 |
|  | Haze (%) |  |  | 3.9 | 3.9 | 3.2 | 3.2 |
|  | Tm (° C.) |  |  | 230 | 230 | 200 | 200 |
|  | Degree of Planner Orientation |  |  | 0.082 | 0.11 | 0.085 | 0.12 |
|  | F100 (MPa) | MD/TD (25° C.) |  | 80/80 | 110/110 | 70/80 | 105/110 |
|  |  | MD/TD (100° C.) |  | 30/25 | 70/75 | 25/25 | 70/75 |
|  | E' (MPa) | MD/TD (100° C.) |  | 300/300 | 1100/1100 | 250/250 | 1000/1050 |
|  |  | MD/TD (180° C.) |  | 35/35 | 70/70 | 30/30 | 60/60 |
|  | TE (%) | MD/TD (100° C.) |  | 330/330 | 250/240 | 330/330 | 250/250 |
|  | Degree of Heat Distortion at 175° C. (%): MD |  |  | 1.0 | 1.0 | 2.0 | 2.0 |
|  | Shrinkage (%) | MD/TD (150° C.) |  | 1.9/1.0 | 2.4/1.2 | 2.1/1.0 | 2.6/1.3 |
|  | Unevenness of Thickness (%) |  |  | 5.7 | 5.3 | 5.7 | 4.6 |
|  | Light Transmit. at 350 nm (%) |  |  | 75 | 75 | 0.6 | 0.6 |
|  | Formability in Vacuum Forming |  |  | ○ | X | ○ | X |
|  | Formability in Pressure Forming |  |  | ○ | X | ⊙ | X |
|  | Formability in Molding |  |  | ⊙ | ○ | ⊙ | ○ |
|  | Solvent Resistance |  |  | ○ | ○ | ○ | ○ |
|  | Print Quality |  |  | X | X | X | X |

TABLE 4

|  |  |  | Ex. 1 | Ex. 5 |
|---|---|---|---|---|
| Component Weight Ratio | A | Copoly PEs (1) | 25 | 25 |
|  | B | PET (1) | 75 | — |
|  | H | PET (3) | — | 75 |
| Film Making Conditions | MD | Stret. Temp. (° C.) | 90 | 90 |
|  |  | Stret. Rate (–) | 3.3 | 3.3 |
|  | TD | Preheat Temp. (° C.) | 120 | 120 |
|  |  | Preheat Time (sec.) | 10 | 10 |
|  |  | Stret. Temp., former (° C.) | 110 | 110 |
|  |  | Stret. Temp., latter (° C.) | 100 | 100 |
|  |  | Stret. Rate (–) | 3.9 | 3.9 |
|  |  | Relaxing Rate (%) | 7 | 7 |
|  | WHOLE | Heat Temp. (° C.) | 235 | 205 |
| Particle Amount | Base Film |  | SiO$_2$ (1.5 μm) 0.03% | — |
|  | Coat Layer |  | — | SiO$_2$ (1.0 μm) 0.05% |
|  |  |  |  | SiO$_2$ (0.05 μm) 10% |
| Film Properties | Thickness (μm) |  | 100 | 188 |
|  | Haze (%) |  | 3.6 | 1.0 |
|  | Haze/Thickness |  | 0.036 | 0.005 |
|  | Tm (° C.) |  | 230 | 230 |
|  | Degree of Planner Orientation |  | 0.078 | 0.078 |
|  | F100 (MPa) | MD/TD (25° C.) | 80/85 | 80/85 |
|  |  | MD/TD (100° C.) | 30/30 | 30/30 |
|  | E' (MPa) | MD/TD (100° C.) | 250/250 | 250/250 |
|  |  | MD/TD (180° C.) | 30/30 | 30/30 |
|  | TE (%) | MD/TD (100° C.) | 350/330 | 350/330 |
|  | Degree of Heat Distortion at 175° C. (%): MD |  | 1.0 | 1.0 |
|  | Shrinkage (%) | MD/TD (150° C.) | 1.5/0.6 | 1.5/0.6 |
|  | Unevenness of Thickness (%) |  | 5.5 | 5.5 |
|  | Light Transmit. at 350 nm (%) |  | 75 | 75 |
|  | Formability in Vacuum Forming |  | ○ | ○ |
|  | Formability in Pressure Forming |  | ○ | ○ |
|  | Formability in Molding |  | ⊙ | ⊙ |
|  | Solvent Resistance |  | ○ | ○ |
|  | Print Quality |  | X | ○ |

TABLE 5

|  |  |  | Comp. Ex. 7 |
|---|---|---|---|
| Component Weight Ratio | J | PET (4) | 100 |
| Film Making Conditions | MD | Preheat Temp. (° C.) | 105 |
|  |  | Preheat Time (sec.) | 7 |
|  |  | Stret. Temp. (° C.) | 105 |
|  |  | Stret. Rate (-) | 3.0 |
|  | TD | Preheat Temp. (° C.) | 115 |
|  |  | Preheat Time (sec.) | 6 |
|  |  | Stret. Temp. (° C.) | 125 |
|  |  | Stret. Rate (-) | 3.2 |
|  |  | Relaxing Rate (%) | 6 |
|  | WHOLE | Heat Temp. (° C.) | 195 |
| Film Properties | Thickness (μm) |  | 100 |
|  | Haze (%) |  | 13 |
|  | Haze/Thickness |  | 0.13 |
|  | Tm (° C.) |  | 256 |
|  | Degree of Planner Orientation |  | 0.138 |
|  | F100 (MPa) | MD/TD (25° C.) | 125/135 |
|  |  | MD/TD (100° C.) | 75/75 |
|  | E' (MPa) | MD/TD (100° C.) | 1100/1200 |
|  |  | MD/TD (180° C.) | 70/70 |
|  | TE (%) | MD/TD (100° C.) | 240/230 |
|  | Degree of Heat Distortion at 175° C. (%): MD |  | 0.5 |
|  | Shrinkage (%) | MD/TD (150° C.) | 1.5/0.3 |
|  | Unevenness of Thickness (%) |  | 14 |
|  | Light Transmit. at 350 nm (%) |  | 78 |
|  | Formability in Vacuum Forming |  | X |
|  | Formability in Pressure Forming |  | X |
|  | Formability in Molding |  | Δ |
|  | Solvent Resistance |  | ○ |
|  | Print Quality |  | X |

TABLE 6

|  |  |  | Comp. Ex. 2 | Comp. Ex. 3 | Comp. Ex. 4 |
|---|---|---|---|---|---|
| Film Properties | Thickness (μm) |  | 200 | 200 | 125 |
|  | F100 (MPa) | MD/TD (25° C.) | 55/55 | 70/70 | — |
|  |  | MD/TD (100° C.) | 2/2 | 35/35 | 11/11 |
|  | E' (MPa) | MD/TD (100° C.) | 20/20 | 1800/1800 | 1000/1000 |
|  |  | MD/TD (180° C.) | 10/10 | 6/6 | 2/2 |
|  | Degree of Heat Distortion at 175° C. (%): MD |  | ≧10 | ≧10 | ≧10 |
|  | Light Transmit. at 350 nm (%) |  | 78 | 0 | 0 |
|  | Formability in Vacuum Forming |  | ⊚ | ○ | ○ |
|  | Formability in Pressure Forming |  | ⊚ | ○ | ○ |
|  | Formability in Molding |  | ⊚ | ⊚ | ⊚ |
|  | Solvent Resistance |  | X | X | X |
|  | Print Quality |  | X | ○ | ○ |

The invention claimed is:

1. A polyester film for forming which comprises a biaxially oriented polyester film comprising a copolyester component, wherein:
   (1) the stress at 100% elongation of the film in each of the machine direction and the transverse direction is 10 to 1000 MPa at 25° C. and is 1 to 100 MPa at 100° C.;
   (2) the storage viscoelasticity (E') of the film in each of the machine direction and the transverse direction is 10 to 1000 MPa at 100° C. and is 5 to 40 MPa at 180° C.; and
   (3) the degree of heat distortion (initial load, 49 mN) of the film in the machine direction is −3% to +3% at 175° C.

2. The polyester film for forming according to claim 1, wherein the copolyester comprises an aromatic dicarboxylic acid component and a glycol component containing ethylene glycol and branched aliphatic glycol and/or alicyclic glycol.

3. The polyester film for forming according to claim 2, wherein the polyester in the biaxially oriented film further comprises 1,3-propanediol units or 1,4-butanediol units as glycol components.

4. The polyester film for forming according to claim 1, wherein the degree of planar orientation of the polyester film for forming is 0.095 or smaller.

5. The polyester film for forming according to claim 1, having a heat shrinkage at 150° C. is 6.0% or smaller in the machine direction and the transverse direction of the film.

6. The polyester film for forming according to claim 1, wherein a melting point of the polyester film is 200 to 245° C.

7. The polyester film for forming according to claim 1, wherein a ratio H/d of haze H (%) to thickness d (μm) of the film is smaller than 0.010.

8. The polyester film for forming according to claim 1, wherein the polyester film is used as a base film and a surface layer having a thickness of 0.01 to 5 μm is laminated on the base film, the base film being substantially free of particles and only the surface layer contains particles.

9. The polyester film for forming according to claim 8, wherein the surface layer comprises mainly an adhesion modifying resin and particles.

* * * * *

UNITED STATES PATENT AND TRADEMARK OFFICE
CERTIFICATE OF CORRECTION

| | |
|---|---|
| PATENT NO. | : 7,198,857 B2 |
| APPLICATION NO. | : 10/570162 |
| DATED | : April 3, 2007 |
| INVENTOR(S) | : Katsufumi Kumano et al. |

It is certified that error appears in the above-identified patent and that said Letters Patent is hereby corrected as shown below:

On the front page: under Foreign Application Priority Data:

add --PCT/JP2004/001245 February 6, 2004--

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,198,857 B2 |
| APPLICATION NO. | : 10/570162 |
| DATED | : April 3, 2007 |
| INVENTOR(S) | : Katsufumi Kumano et al. |

Page 1 of 1

It is certified that error appears in the above-identified patent and that said Letters Patent is hereby corrected as shown below:

On the front page, under (30) Foreign Application Priority Data:

Delete "2003-309804" and replace with --2003-309894--.

Signed and Sealed this

Twenty-fifth Day of September, 2007

JON W. DUDAS
*Director of the United States Patent and Trademark Office*